(12) United States Patent
Arnold et al.

(10) Patent No.: US 11,482,733 B2
(45) Date of Patent: Oct. 25, 2022

(54) DEVICE AND METHOD FOR MECHANICALLY DETECTING ANOMALOUS BATTERY OPERATION

(71) Applicants: Craig Arnold, Princeton, NJ (US); John Cannarella, Rutledge, PA (US); Xinyi M. Liu, Princeton, NJ (US)

(72) Inventors: Craig Arnold, Princeton, NJ (US); John Cannarella, Rutledge, PA (US); Xinyi M. Liu, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 774 days.

(21) Appl. No.: 15/480,576

(22) Filed: Apr. 6, 2017

(65) Prior Publication Data
US 2017/0294686 A1   Oct. 12, 2017

Related U.S. Application Data

(60) Provisional application No. 62/319,063, filed on Apr. 6, 2016.

(51) Int. Cl.
*H01M 10/42* (2006.01)
*H01M 10/0525* (2010.01)
(Continued)

(52) U.S. Cl.
CPC .......... *H01M 10/425* (2013.01); *G01B 11/16* (2013.01); *H01M 10/0525* (2013.01); *H01M 10/486* (2013.01); *H01M 10/488* (2013.01)

(58) Field of Classification Search
None
See application file for complete search history.

(56) References Cited

U.S. PATENT DOCUMENTS

2004/0247994 A1* 12/2004 Masuda .............. H02J 7/00302
429/66
2010/0297482 A1* 11/2010 Yoon ..................... H01M 2/206
429/61

(Continued)

OTHER PUBLICATIONS

Sood et al., "Health Monitoring of Lithium-ion Batteries", 2013 IEEE Symposium on Product Compliance Engineering (ISPCE) Austin, TX 2013, pp. 1-6 (Year: 2013).*

(Continued)

*Primary Examiner* — Brent A. Fairbanks
(74) *Attorney, Agent, or Firm* — Meagher Emanuel Laks Goldberg & Liao, LLP (57) ABSTRACT

An anomalous battery operating detection device, which includes a sensing unit capable of measuring mechanical properties of a battery, coupled to a processor for determining whether anomalous behavior has been detected. These devices measure a mechanical property, identifying a difference in the property, and based on that difference, making a determination of anomalous behavior. Non-mechanical properties may also be utilized when making the determination. Responsive actions can be taken once the anomalous behavior is detected. The battery can be intercalated, and may be a lithium-ion battery cell. Alternatively, the sensing unit may measure strain. In addition, more than one sensing unit may be utilized, or a separate light source may be introduced. The system may be configured to allow the processor to determine the potential for failure before the battery fails.

18 Claims, 10 Drawing Sheets

(51) Int. Cl.
*H01M 10/48* (2006.01)
*G01B 11/16* (2006.01)

(56) References Cited

U.S. PATENT DOCUMENTS

| | | | | |
|---|---|---|---|---|
| 2011/0148359 | A1* | 6/2011 | Noguchi | B60L 3/0046 320/134 |
| 2012/0148890 | A1* | 6/2012 | Goto | H01M 2/1077 429/90 |
| 2013/0093383 | A1* | 4/2013 | Kim | H01M 10/441 320/107 |
| 2014/0107949 | A1 | 4/2014 | Arnold et al. | |
| 2014/0255738 | A1* | 9/2014 | Adams | H01M 10/482 429/90 |
| 2014/0361175 | A1* | 12/2014 | Lim | G01S 7/486 250/341.8 |
| 2015/0188198 | A1* | 7/2015 | Bonhomme | B60L 50/64 429/61 |
| 2015/0270584 | A1* | 9/2015 | Saunders | H01M 10/48 324/426 |
| 2016/0036011 | A1* | 2/2016 | Jung | H01M 10/058 429/174 |
| 2017/0077561 | A1* | 3/2017 | Fukuda | H01M 10/44 |
| 2017/0170668 | A1* | 6/2017 | Hayashizaki | H02J 7/00 |

OTHER PUBLICATIONS

J. Cannarella and C. B. Arnold,"Stress evolution and capacity fade in constrained lithium ion pouch cells," Journal of Power Sources 245, 745-751 (2014).
B. Bitzer, A. Gruhle, "A new method for detecting lithium plating by measuring the cell thickness," J. Power Sources pp. 297-302 (2014).
B. Sood, M. Osterman, M. Pecht, "Health monitoring of lithium-ion batteries," Engineering (ISPCE), 2013.
J. Cannarella, C. B. Arnold, "State of health and charge measurements in lithium-ion batteries using mechanical stress," J Power Sources, 269 pp. 7-14 (2014).
A. Hsieh, S. Bhadra, B. Hertberg, P. J. Gjeltema, A. Goy, J. W. Fleischer, and D. Steingart, "Electrochemical-acoustic time of flight: in operando correlation of physical dynamics with battery charge and health," Energy Environ. Sci. (2015).
J. Cannarella and C.B. Arnold, "The Effects of Defects on Localized Plating in Lithium-Ion Batteries," J. Electrochem. Soc., 162 (7) (2015).

* cited by examiner

DEVICE AND METHOD FOR MECHANICALLY DETECTING ANOMALOUS BATTERY OPERATION

CROSS-REFERENCE TO RELATED APPLICATIONS

This application claims benefit of U.S. Provisional Application No. 62/319,063, filed Apr. 6, 2016, which is hereby incorporated in its entirety by reference.

BACKGROUND OF THE INVENTION

There is a strong technological need for the ability to preemptively identify and prevent catastrophic battery failure events, as evidenced by relatively recent publicized high-profile battery fires. Such battery failures are commonly thought of as being unpredictable, arising from unexpected sources such as internal defects, adverse environmental conditions, and faulty controllers. The cost of battery failure—including the cost of recalling hazardous products—can be significant. In an October 14 statement, one manufacturer estimated that the recall of its smartphones with problematic batteries would cost the company as much as $3 billion over the next several quarters.

Conventional battery management systems can identify the occurrence of failure events by detecting anomalous battery cell behavior using non-mechanical measurements of parameters such as voltage, current, and temperature. However, these conventional measurements lack the ability to reliably predict an impending failure event with sufficient time for preventative action—the electrochemical data may not be sensitive enough to pick up the signal from the anomaly at the early stage—instead concomitantly detecting the event as it occurs.

Thus, there is a need for a device capable of predicting failures in batteries, such that the system can respond in time to prevent a catastrophic failure.

BRIEF SUMMARY OF THE INVENTION

The present invention is directed to devices, systems, and methods for mechanically detecting anomalous battery operation in time to allow the system to prevent catastrophic failure. These devices, systems, and methods utilize at least one sensing unit for measuring a battery's mechanical properties. This includes but is not limited to a single sensing unit or multiple sensing units at different locations, and the sensing units may be mechanical transducers or optical sensors. In addition, these devices, systems, and methods utilize a processor for determining whether anomalous behavior has been detected.

The devices and systems function by measuring a mechanical property, identifying a difference in the property, and based on that difference, making a determination of anomalous behavior. The method the system and devices utilize may also detect battery controller faults, or comparing mechanical properties with non-mechanical ones, or taking responsive actions once the anomalous behavior is detected.

The system and method can be utilized with any type of battery that undergoes a net volumetric change as a function of state of charge, such as but not limited to intercalated batteries, and may be a lithium-ion battery cell. Alternatively, the sensing unit may measure at least one of stress, strain, or modulus. In addition, more than one sensing unit may be utilized, or a separate light source may be introduced, having a wavelength of light of less than 1 mm. The system may be configured to allow the processor to determine the possibility for failure before the battery fails. In some configurations, the battery can be removed without removing the sensing unit, and/or the use of the battery can be modified. The sensing unit may also be capable of detecting various battery faults, including lithium metal plating, overcharging, internal short-circuiting, or gas evolution. The system may also be integrated with a battery management system, and may utilize non-mechanical properties such as voltage, current, or temperature when making its determination of anomalous behavior.

DETAILED DESCRIPTION OF THE INVENTION

Disclosed is a system and method drawn to mechanically detecting anomalous battery operation that is capable of predicting battery failure in time to allow the system to prevent catastrophic failure. Conventional battery monitoring technologies rely on measurements of non-mechanical parameters (e.g. voltage, current, temperature) and attempt to relate these parameters to internal battery operation. These conventional parameters in some cases could be used to detect anomalous battery operation, although in many cases they are insufficient for providing early warning of an impending failure event. In contrast, mechanical measurements by the device disclosed herein have been shown to provide complementary information and can detect anomalous effects.

Anomalous behavior refers to a measurable characteristic of the battery during operation that deviates from a prescribed set of "normal" characteristics determined from prior measurements or from theoretical models. For instance a mechanical measurement showing deviation from a previously determined value would be considered anomalous. Alternatively, some batteries have a net volume change under charging. As one example, lithium ion batteries with graphite anodes expand during charging as lithium ions intercalate into the graphite lattice. Thus, if the charging battery stops expanding, such behavior would be considered anomalous. Such anomalous behavior may be prescribed to correspond to behavior resulting in a reduction in performance, an impending failure event, concomitant failure event, or other anomalous occurrence of interest. Such anomalous behavior of interest include but are not limited to internal short circuiting, electrode degradation, metallic lithium formation, gas evolution, separator shutdown, fire, etc.

Mechanical measurements refer to measurements of mechanical properties such as dimension, volume, pressure, force, etc. Such measurements are typically made by a mechanical transducer. Mechanical transducer is defined here as a device capable of converting mechanical energy (e.g. in the form of pressure, force, displacement, strain, etc.) to a measurable electrical signal. Such transducers may include load cells, strain gauges, displacement sensors, position sensors, pressure sensors, etc. possibly constructed from piezoresistive, piezoelectric, inductive, capacitive, etc. elements. Such transducers are capable of measuring a change in a mechanical property or behavior of a battery cell, cell component, or pack. This may include, but is not limited to, measurements of displacement, force, stress, strain, dimensions, and the material properties affecting these measurements, such as modulus.

Mechanical measurements such as those above can also be made with optical methods. Such detection techniques may rely on the use of photons of varying wavelengths from short wavelength X-Rays through long wavelength Terahertz and millimeter-wave regimes. Techniques employing light may include interference, scattering, transmission, reflection, absorption, ellipsometry and other methods, as depicted in the Figures.

The disclosed device can be combined with conventional battery management systems to provide higher-fidelity battery control and monitoring, and is compatible with common battery chemistries, including but not limited to intercalated batteries such as lithium-ion. Ultimately the ability to preemptively predict failure will enable the development of next generation battery systems with higher safety and reliability.

Figure 1:
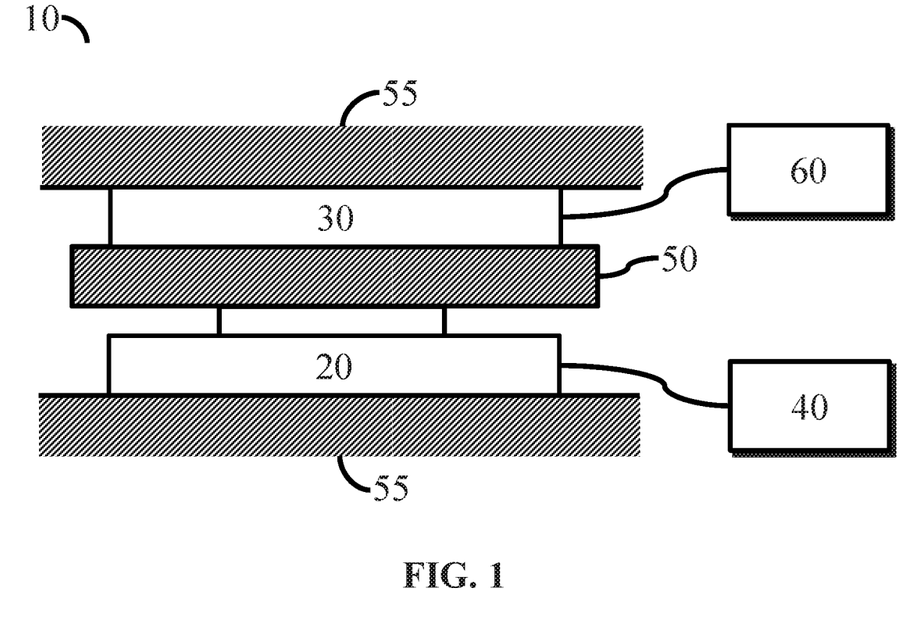
FIG. 1 is an embodiment of a device of the present invention.

More specifically, FIG. 1 depicts a device (10) for detecting anomalous behavior of a battery (30). The battery (30) in FIG. 1 is constrained on at least two sides. A first side is constrained by a wall or another battery (55), while a second side opposite the first is constrained by a plate (50) or other surface connected to a sensing unit (20) for making stress measurements. Although plate (50) is shown in this figure, plate (50) is not required; physical measurements may also be made without the plate by using, for example, a displacement sensor such as a linear variable differential transducer (LVDT). The battery may be connected to, for example, a potentiostat (60) and/or a conventional battery management system. The sensing unit (20) may be connected to a processor (40) or data acquisition unit (DAQ).

The processor, coupled to the sensing unit, may be employed to provide the monitoring and to provide a determination of whether there is anomalous battery operation. The frequency of measurements can be varied based on a variety of factors, including but not limited to: cycling rate; phases such as charge, discharge, and rest; and state of health.

Although the processor can be configured to detect anomalies with as few as 2 data points from the sensing unit, typically increasing the number of data points during a particular step enables the detection of smaller anomaly signals, which allows earlier detection of the anomalies. Thus, preferred systems utilize a configuration where the processor considers at least 10 data points during a particular step to detect an anomaly, and in more preferred systems the processor considers at least 100 data points.

In some instances, measurements and anomaly detection with little or no delay between measurements may be desirable to increase accuracy or sensitivity. In some embodiments, at the end of discharge or charging step, continuous measurements may be beneficial to determine the exact values of minimum and maximum stress. In other embodiments, measurement rates of up to 1, 2, 5, 10, 50, or 100 measurements or more per second may be utilized.

In other instances, periodic measurements separated by longer periods of time may be sufficient, such as but not limited to taking one measurement every 2, 5, 30, 60, or 120 minutes or more may be sufficient. Alternatively, there may be situations where there is a benefit in measuring mechanical properties more frequently during a particular phase (e.g., charging) than during a discharge step, or not measuring mechanical properties during one particular phase at all, such as but not limited to a rest step. For example, for a fully electric car, it may be desirable to only check mechanical properties once an hour while the car is in use, but every 5 minutes while charging.

Alternatively, the frequency can be varied based on other factors, such as but not limited to the battery state of health (SOH) or the aging history of the battery. Typically, as batteries age, there is a higher possibility of a battery failure occurring. Thus, there may be benefit in collecting measurements more frequently in the later cycles. In some instances, a step change in the frequency of measurements may occur after one or more numbers of cycles (e.g., increasing the frequency by 10% every 100 cycles, or doubling the frequency after 500 cycles), and/or the frequency may continuously increase based on the number of cycles (e.g., increasing the frequency by 0.05% every cycle).

Such a system would be of great practical use and benefit for many industries including the portable electronics, automobile, aerospace, and commercial power generation markets.

By monitoring this information, it is possible to observe an indication of impending catastrophic failure before it happens. This includes observing internal shorts, gas evolution, lithium dendrite growth and even predicting when a battery will potentially catch fire. Simply detecting mechanical changes in the battery, without context, may sometimes be insufficient to determine anomalous behavior. For that reason, at least one other aspect (time, current, number of cycles, etc.) related to the battery operation may also be measured.

In one embodiment, the determination of anomalous battery operation comprises detecting at least one of a decrease in strain while the battery is charging, or an increase in strain while the battery is discharging.

Experimental testing of the disclosed device used a mechanical load cell to measure the stack stress on a constrained lithium-ion battery, as depicted in FIG. 1. This stack stress was then monitored and compared with electrical data to identify anomalous operation of the battery cell and/or the battery controller. Such measurements could in principle be made with any mechanical transducer or any sensor that can detect changes in mechanical properties. An exemplary sensor would be low cost and low profile.

Figure 2A:
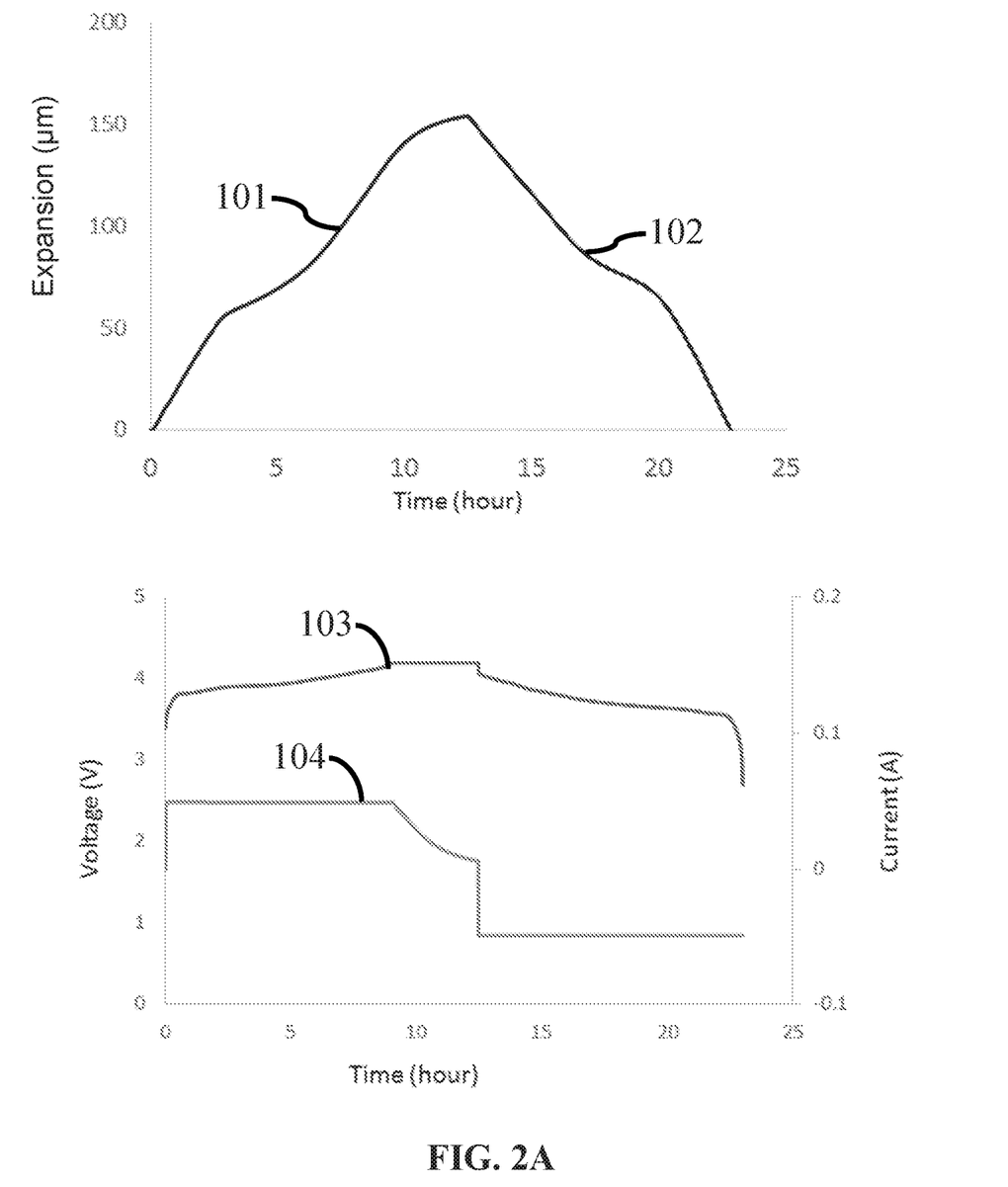
FIG. 2A is a graph illustrating expansion, voltage, and current during normal battery operation.

Referring now to FIG. 2A, the measured expansion (101, 102) of a pouch cell is shown along with the voltage (103) and current (104) for a given period of time. No anomalous behavior is seen.

Figure 2B:
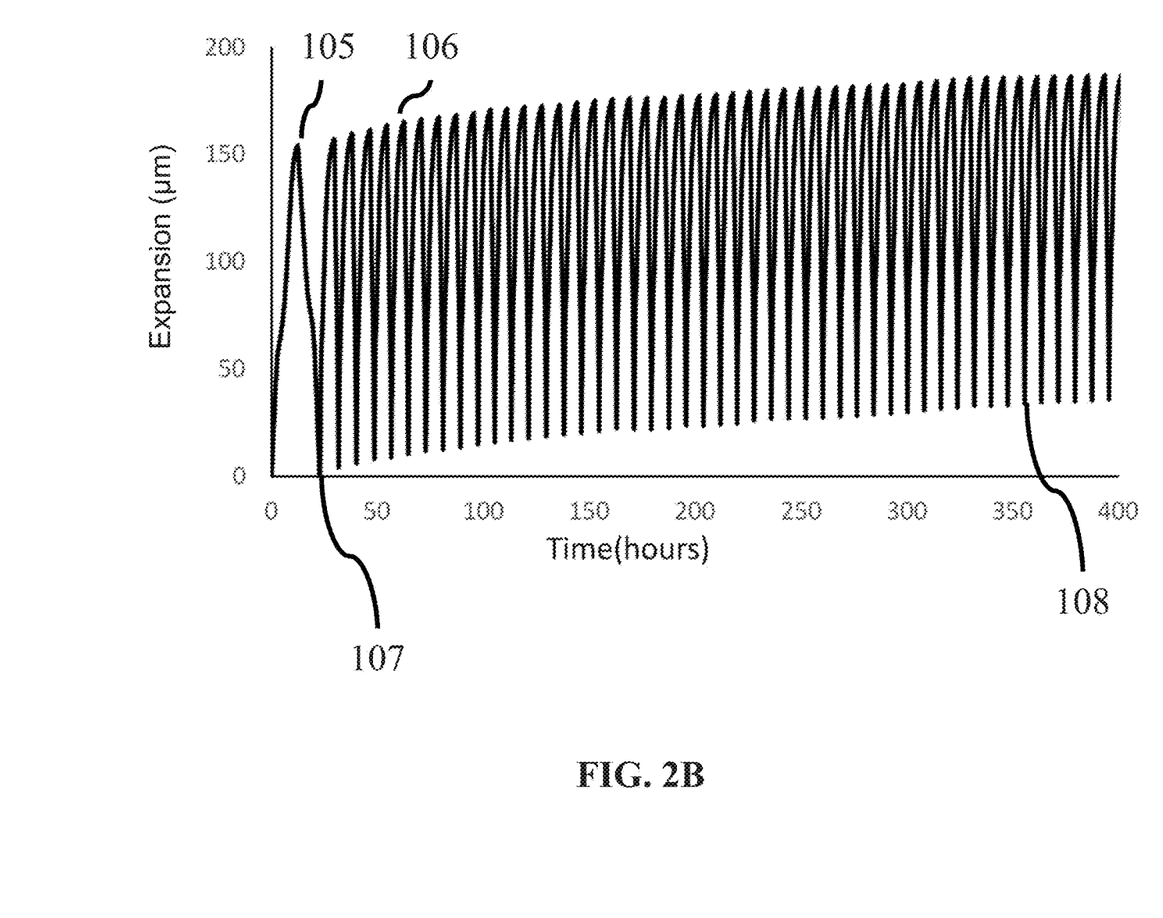
FIG. 2B is a graph illustrating long term battery expansion.

Referring now to FIG. 2B, the long term expansion data of a pouch cell is illustrated. The first cycle (105) is a slow charging/discharging cycle (C/10), followed by multiple quicker cycles (106) (C/2).

The increase of the minimal point (107, 108) in the expansion indicates the growth of a solid electrolyte interphase (SEI) layer. Any deviation from the minimal point may indicate a potential concern, such as but not limited to gas evolution.

Figure 2C:
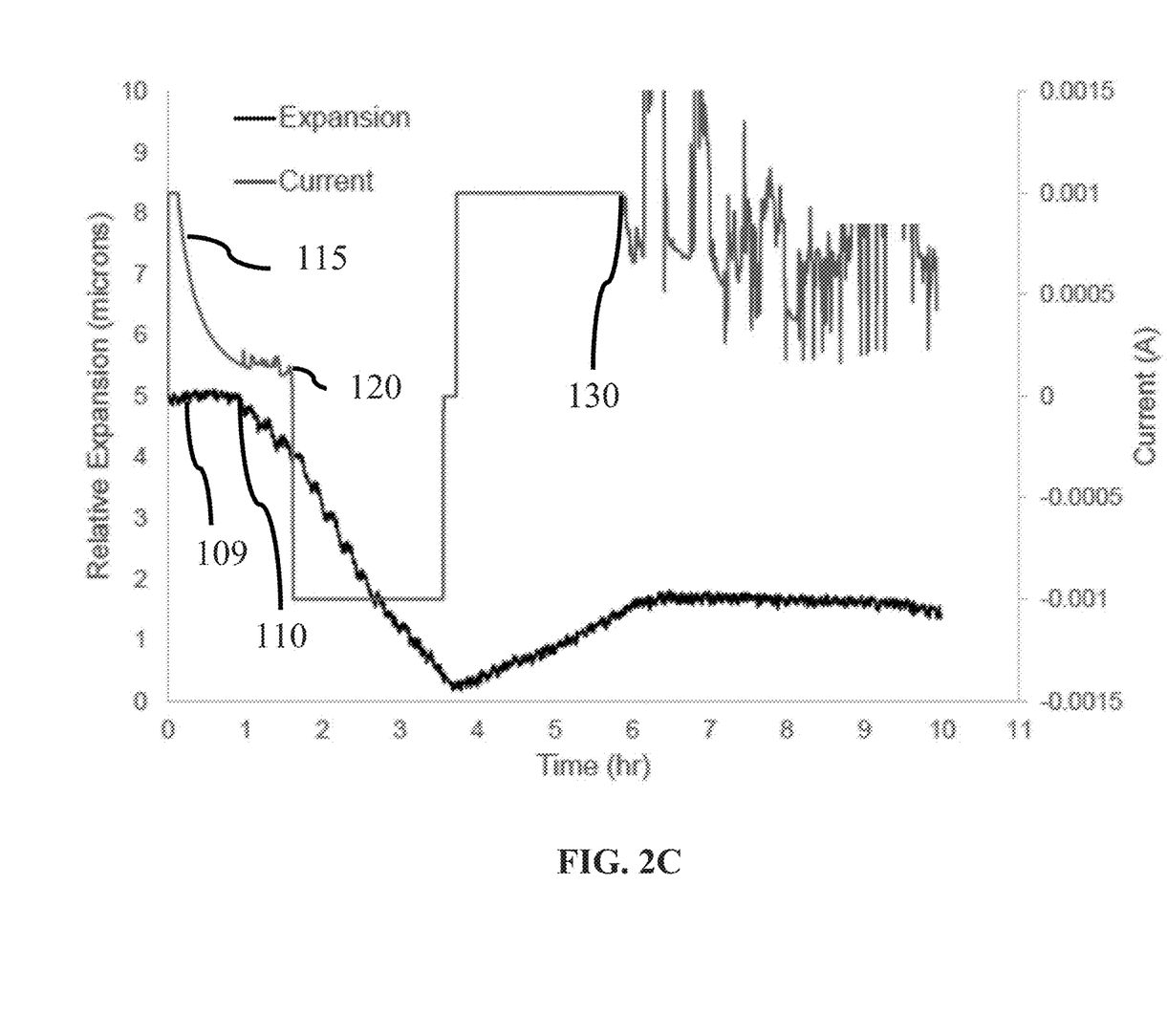
FIG. 2C is a graph illustrating expansion and current during anomalous battery operation.

Referring now to FIG. 2C, the expansion of the battery is shown as being measured along with the current, for a portion of a charge and discharge cycle. Initially, the battery expands (109), which is consistent with the initial portion of the charging cycle (115). However, approximately one hour into the charging cycle, and approximately 30 minutes before the discharge cycle begins (120), the battery stops expanding and begins to compress (110). This constitutes anomalous behavior, and should trigger a series of actions to assure that the cell does not fail catastrophically. Battery failure, as measured by current alone (130), occurs at approximately 6 hours. Thus, in this example, the system was able to predict failure over 4 hours prior to actual cell failure occurring. This is more than sufficient time for the system to allow the use of that battery to be modified, perhaps by allowing it to discharge but not charge, or by simply shutting off current to that battery.

Figure 2D:
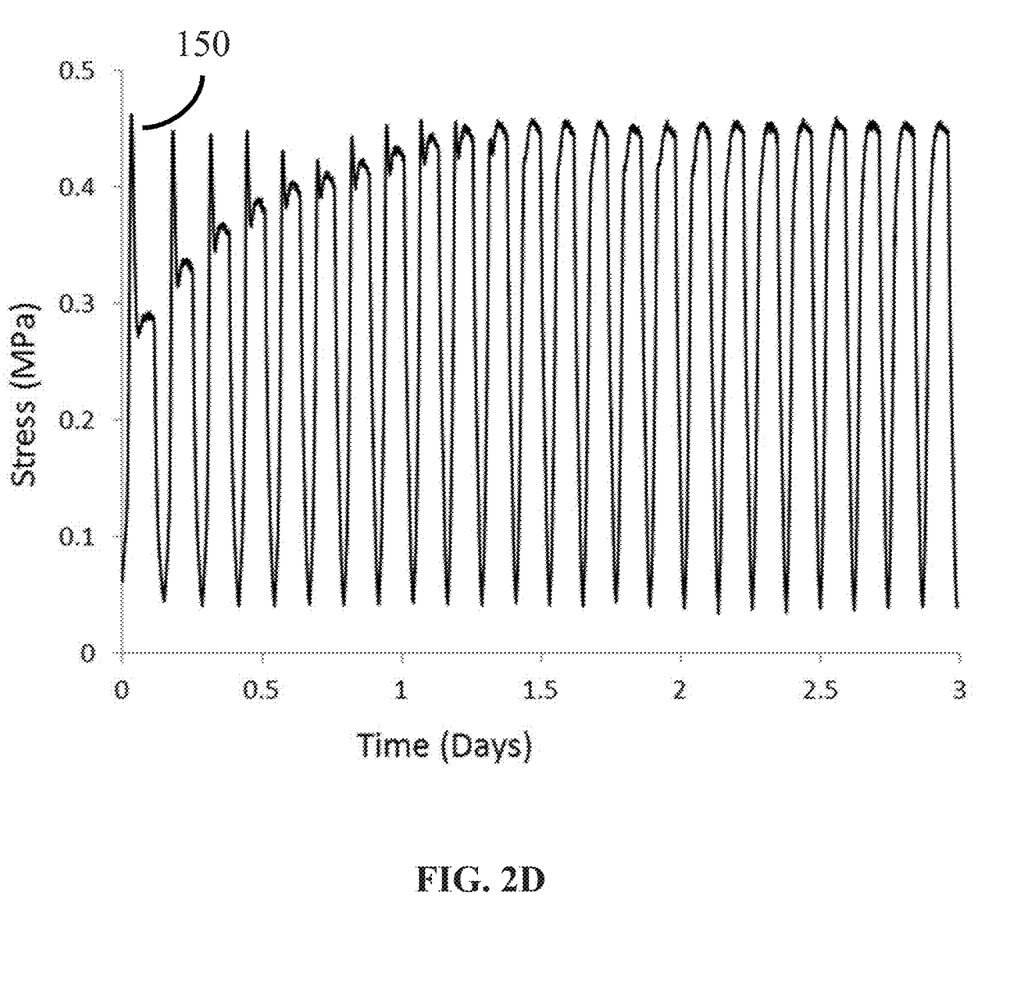
FIG. 2D is a graph illustrating stress measurements identifying anomalous battery operation.

In another embodiment, the determination of anomalous battery operation comprises detecting a peak at the end of a charging step. As shown in FIG. 2D, which is a graph of stress measurement of a cell cycled at fixed rate (1 C) over a period of 3 days. Using a linear variable differential transducer (LVDT) as a sensing unit, the sensing unit was able to detect "peaks" (150) at the end of some charging cycles, indicating lithium plating was occurring. As lithium plating continues, it may eventually cause a short and lead to a catastrophic failure.

In yet another embodiment, larger than expected irreversible stress may be detected, which could indicate gas evolution.

Figure 3:
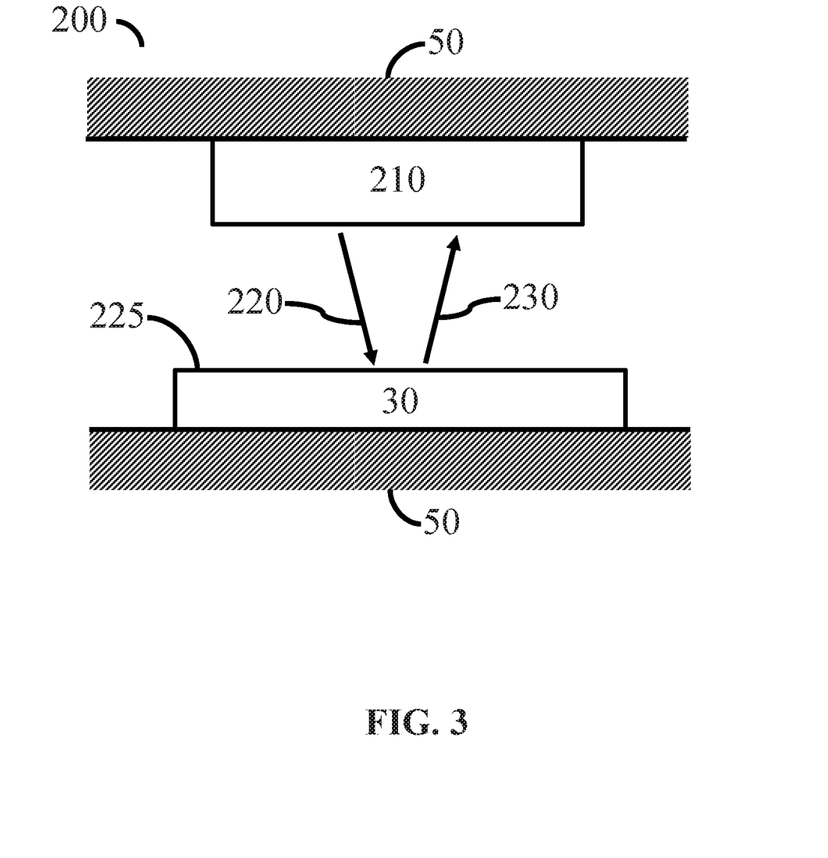
FIGS. 3 and 4 depict additional embodiments of devices.

In other embodiments, the disclosed device for mechanically detecting anomalous battery operation employs an optical method to monitor mechanical changes in a battery cell. Referring to FIG. 3, an optical system (200) comprises a battery (30) within at least two walls (50). A sensing unit (210) serving as both an optical source and sensor, transmits at least one wavelength of radiation (220) towards a first surface (225) of battery (30). Radiation reflecting (230) from the battery (30), or emitted from the battery in response to the transmitted radiation (220), is then detected by sensing unit (210).

Figure 4:
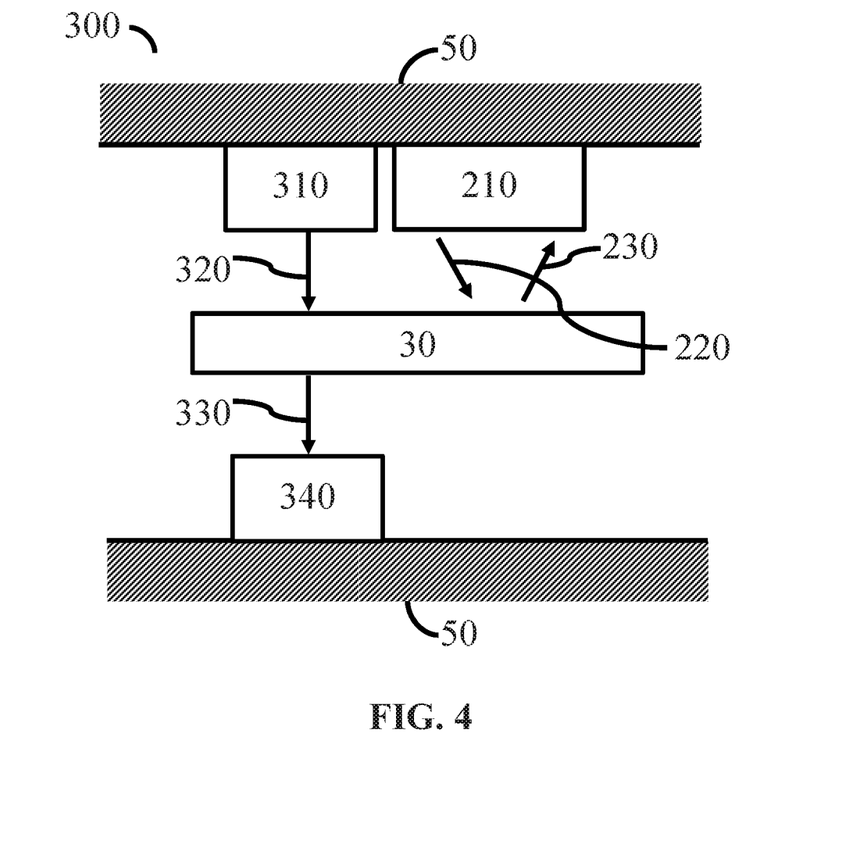

Referring to FIG. 4, an alternate optical system (300) similarly comprises a battery (30) within at least two walls (50). In this embodiment, however, two sensing units are utilized. A first portion utilizes a radiation source (310) on one side of the battery (30) transmitting at least one wavelength of radiation (320) which passes through the battery (30), and any resulting wavelengths of that process (330) are detected by a sensing unit (340) located on a side of the battery opposite the radiation source (310). In addition, sensing unit (210) serves as both an optical source and sensor, transmitting at least one wavelength of radiation (220) towards a first surface of the battery (30). Radiation reflecting (230) from the battery (30), or emitted from the battery in response to the transmitted radiation (220), is then detected by sensing unit (210).

Figure 5:
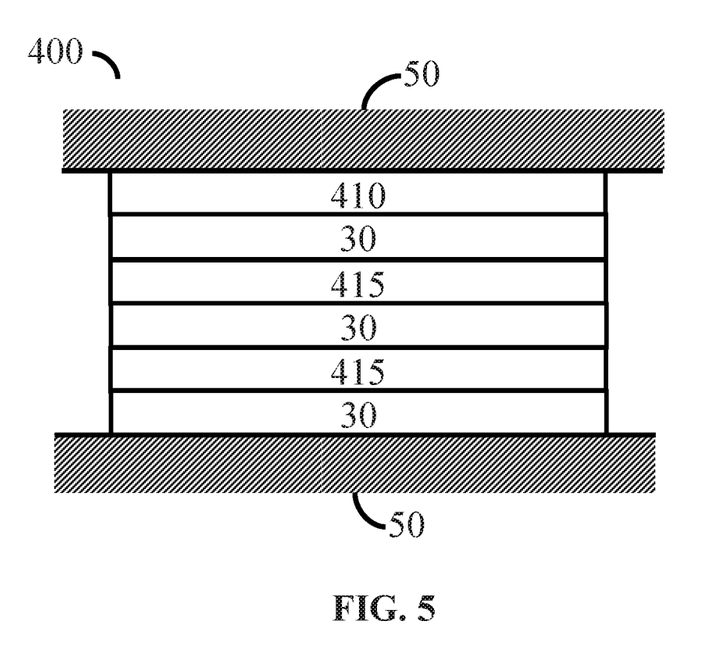
FIG. 5 depicts one embodiment of a multi-cell system.

While the above descriptions describe single battery or battery cell systems, mechanical properties of multi-cell battery systems can be measured as well. In many cases, the testing of a single cell within the multi-cell battery may be sufficient, in which case the above disclosed approaches can be utilized. If more refined data is required, multiple sensing units can be utilized in a single multi-cell battery. Referring now to FIG. 5, the system (400) utilizes several batteries (30) within a single casing (50). A first sensing unit (410) is utilized, which in this instance may comprise a strain gauge comprising an electrical pattern deposited on a thin insulating substrate. In addition, intermediate sensing units (415), including but not limited to other strain gauges, may be integrated between cells or groups of cells. This type of arrangement may be more useful if single cells can be replaced or controlled.

In other configurations, it may be more cost effective to utilize only a single sensing unit (410), and not integrate the intermediate sensing units (415). In this manner, the system would simply detect whether the stack of batteries as a whole are expanding or contracting, for example.

Figure 6:
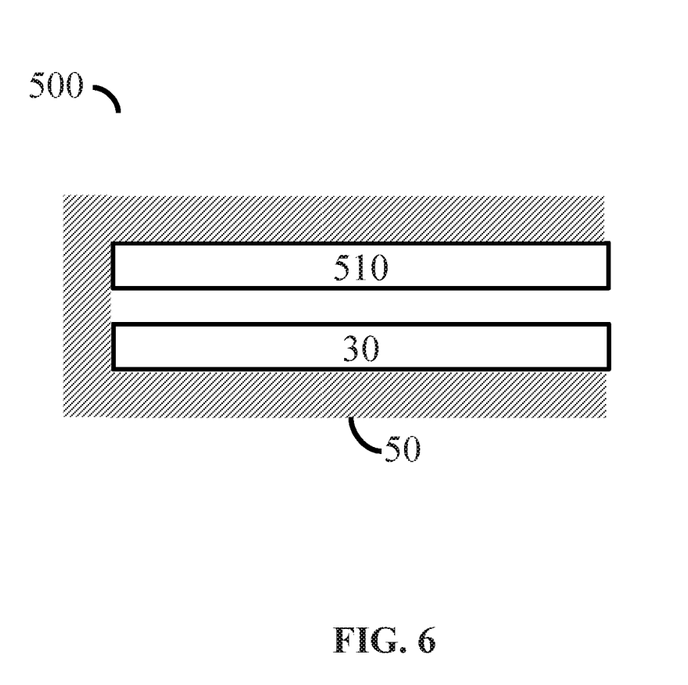
FIG. 6 is an embodiment of the present invention.

These devices allow a battery system to adjust the use of the battery to avoid catastrophic failures. In some cases, this may involve adjusting current to the battery, or eliminating it entirely. In other cases, the battery may be allowed to discharge, but not be recharged. A detected failure may also require the removal of the failing battery. In some instances, the sensing unit is physically coupled to a battery. However, as seen in FIG. 6, a system (500) can be utilized that enables the removal of a failing battery (30) from a case (50) that does not also require removal of the sensing unit (510). In FIG. 6, there is a gap between sensing unit (510) and battery (30), such that the battery (30) can be removed independently of other components. This gap is not required, but is used for illustration purposes only.

Cost and size added by the device to a battery system can be mitigated by using sensors with lower cost and smaller size. The specific relationships between anomalous mechanical behavior and failure are still under investigation. The fidelity of the mechanical measurements predictive ability can be enhanced by comparing mechanical data with electrical data measured by conventional battery systems.

Figure 7:
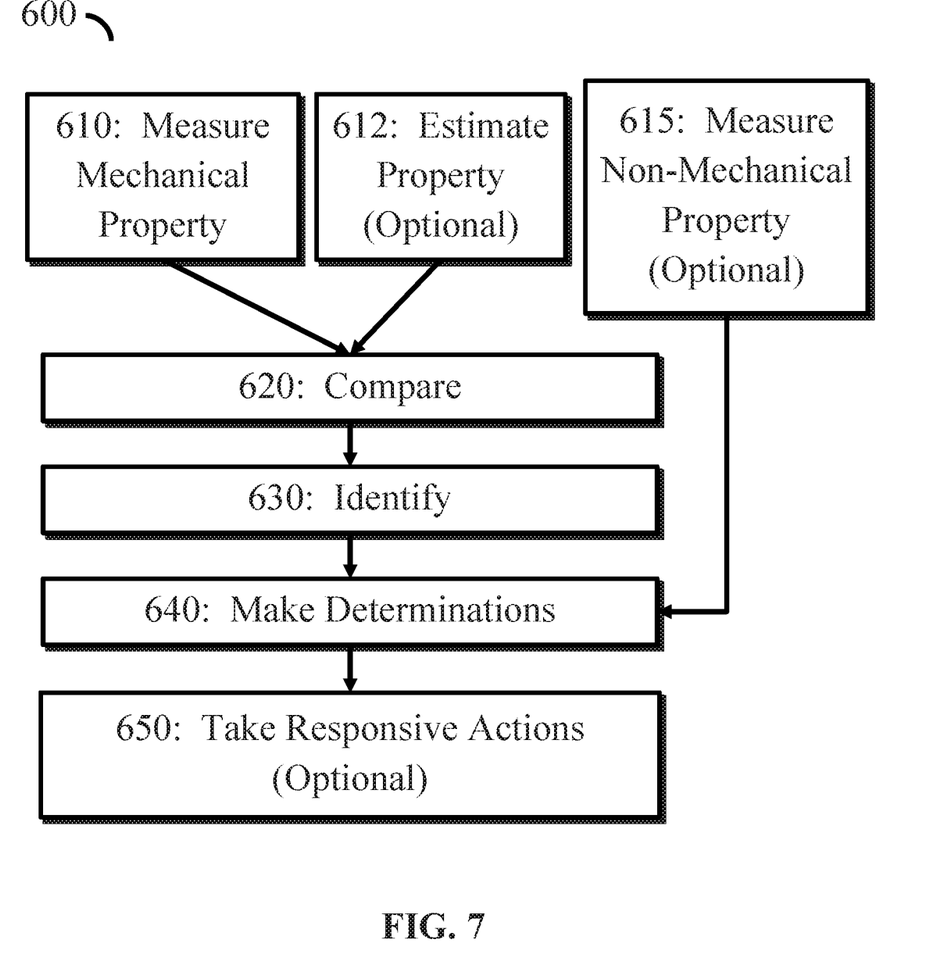
FIG. 7 is a flowchart illustrating an embodiment of a method of the present invention.

Referring now to FIG. 7, a general methodology (600) that can be utilized by these devices is disclosed. First, at least one mechanical property is measured (610). Often, this requires measuring a mechanical property at two or more different points in time. In other embodiments, the mechanical property is estimated (612), which may be based on past performance, measured electrical properties, or some other aspect. For example, if the battery, on standby, is known to discharge at a certain rate, a mechanical property of a battery on standby can be estimated based on that known discharge rate and the previous mechanical property value. A comparison (620) is made of at least one of the measured mechanical property values, or one mechanical property value and an estimated value. A change or difference is thus identified (630) based on that comparison. Measured non-mechanical properties (615) will typically be considered at this time, along with the identified difference (630) in order to make a determination as to whether there is an anomalous battery operation (640). This process may also involve comparing a change in a mechanical property with a change in a non-mechanical property. If it is determined that anomalous battery operation is occurring (640), then responsive actions can be taken (650). These responsive actions may include, but are not limited to, displaying a warning on a user interface, emitting a warning sound, shutting down a device associated with the battery, or modifying the use of the battery cell.

Battery controller faults can also be detected, by utilizing a plurality of measurements of the mechanical property and cross-referencing with at least one of a voltage or current measurement of at least one of a battery cell or battery controller.

The disclosed approach can be used in any system containing battery cells that exhibit changes in mechanically-measurable properties. The mechanical data provided by the device could be used to detect anomalies as a standalone system, or incorporated into a conventional battery management system to provide an additional independent data stream that can be used to create higher-fidelity detection of anomalous behavior.

The disclosed approach has applicability to any system in which it is desired to prevent battery failure, such as consumer electronics, electric vehicles, avionics, and general large-scale battery systems.

Various modifications and variations of the invention in addition to those shown and described herein will be apparent to those skilled in the art without departing from the scope and spirit of the invention, and fall within the scope of the claims. Although the invention has been described in connection with specific preferred embodiments, it should be understood that the invention as claimed should not be unduly limited to such specific embodiments.

What is claimed is:

1. A device for mechanically detecting anomalous battery behavior, comprising:
   one or more sensing units, configured as:
   i. one sensing unit operationally coupled to a first surface;
   ii. two or more sensing units each operationally coupled to the first surface; or
   iii. one or more sensing units operationally coupled to the first surface and one or more sensing units operationally coupled to a second surface, the second surface being opposite the first surface; and
   a processor, coupled to the sensing unit, configured to receive input from the one or more sensing units and make a determination of anomalous battery operation by, for each of the one or more sensing units, comparing a value of a mechanical property measured by the sensing unit to a value of the mechanical property measured by the sensing unit at a different point in time and using electrical data to identify a decrease in strain while the battery is charging or an increase in strain while the battery is discharging, or to identify an increase in a minimum pressure detected during repeated charge/discharge cycles,
   wherein each sensing unit comprises at least one of a mechanical transducer or optical sensor.

2. The device of claim 1, wherein the battery cell is an intercalated battery cell.

3. The device of claim 1, wherein the at least one mechanical property is strain.

4. The device of claim 1, wherein the sensing unit comprises a first mechanical transducer or optical sensor and at least one additional mechanical transducer or optical sensor.

5. The device of claim 1, further comprising a light source.

6. The device of claim 1, configured such that the processor is capable of identifying anomalous battery behavior of the at least one battery cell before a failure event occurs.

7. The device of claim 6, wherein the identified at least one battery cell can be removed without removing the sensing unit.

8. The device of claim 6, further configured to allow the use of the identified at least one battery cell to be modified following the identification of anomalous battery behavior.

9. The device of claim 1, wherein the sensing unit is capable of detecting at least one of lithium metal plating, lithium dendrite growth, internal short-circuiting, separator degradation, or gas evolution.

10. The device of claim 1, further comprising a battery management system capable of measuring non-mechanical properties related to the at least one battery cell is coupled to the processor, wherein the processor is configured to make a determination of anomalous battery operation based on both mechanical and non-mechanical properties.

11. The device of claim 10, wherein non-mechanical properties comprise at least one of voltage, current, or temperature.

12. The device of claim 10, wherein the identified at least one battery cell can be removed without removing the sensing unit.

13. The device of claim 1, wherein the sensing unit is configured to receive at least one wavelength of radiation from a radiation source configured to transmit the at least one wavelength of radiation through the first battery cell.

14. The device of claim 1, wherein the sensing unit is attached to the first battery cell and an additional battery cell.

15. A method for mechanically detecting anomalous battery behavior, comprising the steps of:
    measuring a mechanical property of a battery cell at a first point in time with one or more sensor units configured as:
    i. one sensing unit operationally coupled to a first surface; or
    ii. two or more sensing units each operationally coupled to the first surface; or
    iii. one or more sensing units operationally coupled to the first surface and one or more sensing units operationally coupled to a second surface, the second surface being opposite the first surface;
    identifying at least one difference in the at least one mechanical property by comparing the measurement of the mechanical property with at least one of a measurement of the mechanical property at a second point in time or a prediction of the mechanical property at the first point in time; and
    determining whether there is anomalous battery operation based upon the identification of a decrease in strain while the battery is charging or an increase in strain while the battery is discharging, or upon identification of an increase in a minimum pressure detected during repeated charge/discharge cycles.

16. The method according to claim 15, further comprising the step of detecting battery controller faults by utilizing a plurality of measurements of the mechanical property and cross-referencing with at least one of a voltage or current measurement of at least one of a battery cell or battery controller.

17. The method according to claim 15, further comprising the step of comparing the identified at least one change in the at least one mechanical property with at least one change in at least one non-mechanical property.

18. The method according to claim 15, further comprising the step of taking a responsive action selected from the group of: displaying a warning on a user interface, emitting a warning sound, shutting down a device associated with the battery, or modifying the use of the battery cell.

* * * * *